United States Patent [19]

Dien et al.

[11] Patent Number: 4,990,187
[45] Date of Patent: Feb. 5, 1991

[54] PROCESS FOR PREPARING GRAVURE BASE INK

[75] Inventors: Chi K. Dien, Jamesburg; Daniel J. Carlick, Livingston, both of N.J.

[73] Assignee: Sun Chemical Corporation, Fort Lee, N.J.

[21] Appl. No.: 419,294

[22] Filed: Oct. 10, 1989

Related U.S. Application Data

[63] Continuation-in-part of Ser. No. 190,569, May 5, 1988, abandoned.

[51] Int. Cl.$^5$ ............................................. C09D 11/02
[52] U.S. Cl. ......................................... 106/30; 106/23; 106/499; 106/500; 106/504
[58] Field of Search ................... 106/30, 23, 499, 500, 106/504

[56] References Cited

U.S. PATENT DOCUMENTS

| | | | |
|---|---|---|---|
| 2,776,895 | 1/1957 | Biser | 106/500 |
| 3,375,123 | 3/1968 | Krocker et al. | 106/500 |
| 4,015,999 | 4/1977 | Robertson et al. | 106/500 |
| 4,158,572 | 6/1979 | Blackburn et al. | 106/499 |
| 4,170,487 | 10/1979 | Robertson et al. | 106/500 |
| 4,175,979 | 11/1979 | Robertson et al. | 106/505 |
| 4,177,082 | 12/1979 | Robertson | 106/500 |
| 4,188,236 | 2/1980 | Robertson et al. | 106/500 |
| 4,680,057 | 7/1987 | Hays | 106/23 |
| 4,793,863 | 12/1988 | Anantharaman et al. | 106/30 |

Primary Examiner—Mark L. Bell
Assistant Examiner—Helene Klemanski
Attorney, Agent, or Firm—Jack Matalon

[57] ABSTRACT

Gravure base inks are prepared by flushing an aqueous pigment with a hydrocarbon solvent solution of a major amount of calcium resinate or magnesium resinate and a minor amount of zinc resinate in the presence of a $C_8$–$C_{24}$ fatty acid amine or $C_8$–$C_{24}$ fatty acid quaternary ammonium salt. The solvent to metal ratio is at least 40:60 and the pH is in the range of 4 to 10.

14 Claims, No Drawings

PROCESS FOR PREPARING GRAVURE BASE INK

This application is a continuation-in-part of application Ser. No. 190,569 filed May 5, 1988 and now abandoned.

The present invention relates to a process for the preparation of a gravure base ink. In accordance with the inventive process, a pigment slurry is flushed directly into ink vehicles comprising an organic solution of certain metal resinates.

BACKGROUND OF THE INVENTION

When preparing commercial printing inks, pigments are utilized in a variety of forms. Previously, dry pigments were used exclusively, and they are still being used for formulating certain printing inks such as those used for gravure printing. Dry pigments are generally prepared by filtering the pigment from a water or solvent medium followed by washing, drying and pulverizing to obtain the dry pigment in the desired finely divided or powdered form. Such finely divided or powdered dry pigments are, however, somewhat difficult to redisperse in printing ink vehicles.

Although wet presscakes or water dispersions have been used commercially in the manufacture of printing inks, such feed materials are limited to aqueous systems. The so-called "flushing" procedure has been used extensively for many years. In general, flushed pigments are made by transferring pigment particles from wet presscakes or from an aqueous phase to an organic vehicle such as a non-polar oil or resin phase. Although the flushing has the advantage of avoiding the costly and time-consuming drying operations necessary for the preparation of dry pigments, it has the drawbacks of still requiring special filtration and mixing equipment as well as overcoming the problems attendant upon the use of such equipment.

U.S. Pat. No. 4,634,471 discloses admixing an aqueous pigment slurry with an emulsion containing water, an emulsifying agent and an organic liquid selected from organic resins, organic solvents and mixtures thereof, followed by flushing the admixture thus formed with a hydrophobic organic vehicle. However, after the mixing step and prior to flushing, the admixture must be treated in a "concentration zone" that is preferably a filter such as a plate and frame filter press. Thus, this patented process requires a special filtration step to remove water.

There also have been proposals for preparing offset inks by directly converting the pigment from an aqueous slurry to a finished ink. However, such a process requires a high shear, high horsepower mixer as well as other special equipment.

Prior to the present invention, gravure inks were manufactured using pigments in their dry color form. Thus flushed pigments which offer numerous technical and economic advantages over dry color pigments generally could not be used to prepare inks suitable for gravure printing because of the particular requirements of gravure printing. Other types of inks such as offset inks are manufactured from pigments dispersed in vehicles typically consisting of alkyd polymers in one or more relatively high-boiling point hydrocarbon oils (e.g. Magie Oil 500). However gravure inks utilize pigment vehicles in which the metal resinates are dissolved in a relatively low-boiling hydrocarbon solvents (e.g. toluene, lactol spirits, etc.). Although dry color pigments can be dispersed in such hydrocarbon solvents, the same cannot be said for pigments attempted to be flushed from the aqueous phase (i.e. wet presscake) into the hydrocarbon phase.

Gravure ink vehicles contain a varnish component which is usually a metal resinate or mixture of metal resinates. However, it has also been discovered that some metal resinates produce gravure inks which exhibit poor printing quality.

The present invention provides an effective process for overcoming the problems referred to above. The process is economical and allows for the manufacture of high quality gravure inks containing flushed pigments as well as the traditional gravure ink vehicle components. By practice of the present invention, not only is a high quality gravure ink obtained, but considerable savings are realized because the conventional filtration, drying and grinding steps required to produce dry color are eliminated. Moreover, the process of the present invention can be carried out in an ordinary reactor or tank provided with a low energy agitator rather than the expensive, special high energy equipment required for dispersion of pigments using pigments in the dry color form.

SUMMARY OF THE INVENTION

The present invention is directed to a process for the preparation of a base ink suitable for conversion to gravure printing ink comprising the steps of:

(a) admixing an aqueous slurry of a pigment with a solution of at least one metal resinate in an organic solvent, the resulting admixture having a solvent to metal resinate weight ratio of at least 40:60, a pH ranging from 4 to 10, and containing a minor amount of a $C_8$–$C_{24}$ fatty acid amine or $C_8$–$C_{24}$ fatty acid quaternary ammonium salt, said metal resinate being selected from the group consisting of: (i) calcium resinate, (ii) magnesium resinate, (iii) a mixture of a major amount of calcium resinate and a minor amount of zinc resinate, (iv) a mixture of a major amount of magnesium resinate and a minor amount of zinc resinate, and (v) a mixture of a major amount of calcium resinate plus a minor amount of magnesium resinate and zinc resinate;

(b) agitating the resultant admixture in a mixer at a temperature of from about 15 to about 95° C. for a time sufficient to form large pigment beads;

(c) discontinuing the agitation and permitting the large pigment beads to separate;

(d) removing water from the large pigment beads by physical means other than filtration;

(e) removing residual water from the pigment mass resulting from step (d) by azeotropic distillation; and (f) cooling the resultant substantially water-free mass to ambient temperature.

Detailed Description of the Invention

In the practice of the present invention, the starting materials include an aqueous slurry of the pigment, an organic solvent solution of metal resinates, and a $C_8$–$C_{24}$ fatty acid amine or $C_8$–$C_{24}$ fatty acid quaternary ammonium salt. The latter may be added to the system, either initially, e.g. in the aqueous slurry, as well as during or intermediate of the various processing steps.

It is essential that the process utilize the $C_8$–$C_{24}$ fatty acid amine or $C_8$–$C_{24}$ fatty acid quaternary ammonium salt. It has been found that the pigment will not "flush" or will only partially "flush" from the aqueous phase to the organic phase in the absence of the amine or quaternary ammonium salt.

All of the conventional pigments useful in printing inks may be employed in the present process, and the use of a special pigment does not constitute a feature of the invention. Illustrative pigments include Pigment Yellow 12 (green shade and red shade), Pigment Red 49-1, Pigment Red 57-1, and the like.

The pigment slurry is formed by diazotization or tetrazotization of an aromatic amine in acid and water with sodium nitrate; the diazonium or tetrazonium salt is introduced into an aqueous coupling component to form the color. In the case of Red 49-1 and Red 57-1, metallization is necessary to form the final insoluble pigment. These pigment slurries are prepared for conventional processing well known by the skilled artisan. In general, the aqueous slurry will contain from about 2 to 10% by weight of pigment with the remainder being water and inorganic salts.

The solution of metal resinates is formed merely by admixing the metal resinates with an organic solvent. As mentioned above, the metal resinate must be one selected from the group consisting of: (i) calcium resinate, (ii) magnesium resinate, (iii) a mixture of a major amount of calcium resinate and a minor amount of zinc resinate, (iv) a mixture of a major amount of magnesium resinate and a minor amount of zinc resinate, and (v) a mixture of a major amount of calcium resinate plus a minor amount of magnesium resinate and zinc resinate.

The selection of a metal resinate is critical since it has been found that if zinc resinate is present as the sole metal resinate (or even present as the major amount in a mixture of metal resinates), the resultant base ink prints very poorly. However, base inks of high quality are obtained when the zinc resinate is present in a minor amount.

For the purposes of the present invention, the preferable metal resinate is either a mixture of a major amount (e.g. 60-90% of the total resinate content) of calcium resinate and the balance of the resinate content being zinc resinate or a mixture wherein the balance of the resinate content is a mixture of 5-15% magnesium resinate and 5-25% zinc resinate. Suitable metal resinates are available commercially such as St. John's MR-522, MR-509 and MR-516, as well as Union Camp's Unirez 1061, 1062 and 1059.

Various organic solvents may be employed to form the solution of metal resinates. The preferred solvents include toluene, $C_5$–$C_{20}$ aliphatic hydrocarbons and lactol spirits; the latter is a commercial name for a mixture of aliphatic hydrocarbon solvents with a boiling point range of 97 to 107° C.

It is also essential in the present invention that the weight ratio of solvent to metal resinate should be 40:60 or higher. More particularly, it was found that this ratio must be at least 40:60 in order for the flushing procedure to be effectively employed to prepare gravure printing inks with vehicles containing metal resinates. It is so important to maintain this ratio that extra solvent such as toluene, $C_5$–$C_{20}$ aliphatic hydrocarbons, or lactol spirits may be added during processing.

Another essential feature of the invention is the use of a $C_8$–$C_{24}$ fatty acid amine or $C_8$–$C_{24}$ acid quaternary ammonium salt in the system as an aid to flushing. Without the fatty acid amine or quaternary ammonium salt, the described product will not be obtained It was found that if the fatty acid amine or quaternary ammonium salt is omitted, proper flushing is not obtained. In the absence of the fatty acid amine or quaternary ammonium salt, the metal resinate acts as an emulsifier thereby inhibiting flushing from the aqueous phase to the organic phase. As previous noted, this additive may be added initially and/or during processing. In general, only minor amounts of the fatty acid amines need be used, i.e., sufficient in amount to aid in the flushing operations. Amounts ranging from about 2 to about 30% wt %, preferably 5 to 10 wt. %, based on pigment content are suitable. Illustrative fatty acid amines include such commercially available materials as Duomeen T, Triamine T and Kemamine Q-6502C manufactured by Akzo Chemical America and Humko Chemical. Duomeen T is N-tallow-1,3-diaminopropane; while Triamine T is N-tallow-3,3'-diamino bispropylamine. Other useful fatty acid amines include, but are not limited to, the following:

Duomeen C (N-coco-1,3-diamino propane)
Duomeen O (N-oleyl-1,3-diamino propane)
Triamine C (N-coco-1,3'-diamino propane)
Dimethyl dicoco ammonium chloride
Dimethyl dioctyl ammonium chloride
Dimethyl dilauryl ammonium chloride In general, the flushing procedure will be carried out at temperatures ranging from 15 to 95° C., preferably from 20 to 50° C., and at a pH ranging from 4 to 10, preferably 5 to 8.

After combining the aqueous slurry with the organic solvent solution of metal resinates, the resulting admixture is subjected to agitation. Prior to agitation or during the initial stage of agitation, the admixture may be adjusted to ensure that the proper ratio of solvent to metal resinates exists, that sufficient fatty acid amine (or quaternary ammonium salt) is present, and that the pH is within the prescribed range. It is possible, for example, to add the fatty acid amine or the quaternary ammonium salt and extra solvent after a short period of agitation. Any pH adjustment required can be made at the same time.

Agitation may be carried out effectively in a conventional reactor or tank provided with low-speed agitators. Most conventional agitators, which give an effective mixing, can be used for the present invention. For instance, a simple blade paddle-type agitator or a 2 to 4 blade impeller agitator or a turbine propeller type agitator will give satisfactory results. Relatively slow speeds at 20–500 rpm are sufficient for this operation. High speed agitators can also be used, but they are not essential for the present purposes.

Agitation is carried out at a temperature of about 15 to about 95° C. for a period of time sufficient to produce the desired size of the pigment beads, usually from 1 to 5 mm. For most purposes, the required agitation will be completed within a time period ranging from 0.25 to 3 hours, and preferably from 0.5 to 1 hour. It will be understood, however, that the exact agitation time period is not critical and that the bead size can vary widely. When carrying out the process of the present invention under its controlled conditions, the pigments are transferred smoothly from the slurry into the organic solvent solution of metal resinates. Initially, there are small sand-like particles which grow to larger beads with agitation and eventually to a big lump. In general, agitation is stopped when large bead sizes are formed, which facilitates the separation of the bulk of the water therefrom by physical means other than filtration or the type of concentration zone described in the prior art.

Bulk water can be removed simply by decanting or siphoning. The remaining material is then transferred to a mixer. The mixing action pushes the beads together to form large soft lumps or magma and squeezes out more water that can be separated from the magma. It is washed with water until the conductivity of the wash water is 0.05-0.06 or less milli mhos/cm. This ensures that all the inorganic salts and water soluble organic materials formed in the pigment preparation process are removed from the final ink. Multiple batches of water may be used to ensure adequate washing. The mixer provided with low-speed mixing means such as (describe equipment, agitators, rpm, etc.). A Baker-Perkins double arm mixer, Nauta mixer or any other mixer that can handle paste material and have heating and vacuum systems to remove the residual water can be used in this operation.

The washed material is then heated to a temperature of from about 50 to 110° C., preferably 80 to 90° C., under vacuum to effect azeotropic distillation. Preferably the distillation equipment is arranged to separate water from the azeotropic mixture while permitting recycling of the organic solvent to the mixer. The flexibility of the present process permits additional metal resinates solution in the organic solvent to be added following the washing step and/or while mixing the material during heat up to the distillation temperatures.

Another aspect of the invention involves raising the temperature somewhat at the end of distillation, i.e., up to about 100° C., to remove water of crystallinity from the pigment molecules.

The product mixture, following azeotropic distillation, is cooled in the mixer to ambient temperatures. If necessary, more metal resinates, organic solvent, or other ink additives may be added. Product obtained from the mixer is referred to herein as base ink and will generally have a pigment content of from about 20 to 25% by weight, containing less than 1% by weight of moisture.

The base inks of the present invention have a higher pigment content (and a higher viscosity) than that required for gravure printing inks. The base inks are heavy, but pumpable dispersions and may be conveniently stored at central warehouses and thereafter shipped to required locations for conversion into the final gravure printing ink. The base inks may then be readily converted into the final printing inks by adding additional varnish, solvent, clay fillers, waxes, etc. Alternatively, if desired, the final ink may be prepared by adding such ingredients to the pigment mass resulting from step (f) set forth in the "Summary of Invention" without removing the mass from the mixer and thereafter shipping the final ink directly to the customers' printing plants.

The invention will be more fully understood by reference to the following specific embodiments:

EXAMPLE 1

The pigment slurry consisted of 585 g. Pigment Yellow 12, 65 g Duomeen T and the balance was water (the volume of slurry was 14,500 ml and it had a pH of 5.9). To this slurry was added a solution formed from 864 g of St. John's MR-522 varnish in 60 ml toluene; St. John's MR-522 varnish consisted of 363 g calcium resinate and 155 g zinc resinate dissolved in 398 g toluene.

The resulting admixture was agitated for 5 minutes at a temperature of about 25° C., followed by the addition of another 26 g toluene while agitating. Agitation was continued for a total of 1 hour, utilizing a conventional laboratory stirrer. A four-blade propeller stirrer was used although a homemade two-blade paddle stirrer can also be used successfully. Pigment beads started to form within 10-15 minutes following addition of the extra toluene, and the beads rapidly settled at the bottom of the reactor vessel once agitation ceased. The clear water solution at the top of the vessel was decanted, while the remaining material, substantially comprising heavy pigment beads and residual water, was transferred to a Sigma blade double arm mixer for washing and water removal.

The material in the mixer was washed with 1,200 ml of water four times, until the conductivity of the wash water was 0.05-0.06 or less milli mhos/cm. A solution of 262 g St. John's MR-522 varnish and 100 ml of toluene was added slowly. Mixing was carried out for 30 minutes, and a solution of 224 g of St. John's MR-522 and 224 ml of toluene was added. Mixing was continued for 1-2 hours to form a homogeneous mixture, which was heated to 80-90° C. under vacuum using condensation equipment on the mixer so that water was separated from the azeotropic mixture while returning or recycling the toluene to the mixer. Distillation was stopped when water separation from the azeotropic mixture slowed down. Approximately 100 ml of water was distilled off. The ratio of toluene to metal resinates was at least or greater than 40:60.

Additional varnish, solvent and other additions could be added to the thus-treated material, after cooling, to give a total of 2,600 g of base ink; provided that the final ratio of toluene to metal resinates was at least 40:60.

The resulting base ink was converted to gravure printing ink in accordance with the following formulations:
(A) Yellow ink for coated paper
  65 parts St. John's MR-522 varnish
  27 parts of the above yellow base ink
  6.5 parts ethyl hydroxyethyl cellulose dispersion
  1.5 parts wax dispersion
This ink was made in simple agitation equipment and diluted with 100 ml solvent to a viscosity of 18 seconds in No. 2 shell cup before application.
(B) Yellow ink for uncoated paper
  9 parts St. John's MR-522 varnish
  27.5 parts of the above yellow base ink
  24.5 parts clay base
  30.5 parts ethyl hydroxyethyl cellulose dispersion
  7.2 parts polyamide varnish
This ink was also made by agitation and diluted with 50 ml solvent to 18 second viscosity in No. 2 shell cup before application.

When the gravure printing ink was tested, it was at least equivalent in performance to conventional gravure printing ink prepared from dry pigment.

EXAMPLE 2

Example 1 was repeated, except without the addition of Duomeen T, and utilizing St. John's MR-522 varnish (i.e., the toluene to metal resinate ratio was 40:60) without the addition of extra toluene. No pigment bead formation occurred; nor was there any sign of flushing after 2 hours of agitation.

EXAMPLE 3

A slurry of 14,400 gms of Pigment Red 49-1 (Lithol Red) containing 540 g of pigment was adjusted to 6.0 pH with acetic acid. A solution of 720 g of St. John's MR-522 varnish containing 60% metal resinates and 150 ml toluene was added to the red pigment slurry. After being agitated for 5 minutes in the same equipment employed in Example 1, another 30 ml of toluene were added. An emulsion of 27 g Duomeen T in 270 ml of water at 55° C. was added after agitating for 10 minutes. The pH was then readjusted to 6.0 pH with acetic acid.

Pigment beads formed slowly and grew larger with agitation. The resulting mixture was agitated for a total of 90 minutes. Water was then siphoned off. The remaining material was washed followed by removal of residual water by distillation as in Example 1. The product thus obtained was converted to a base ink also as in Example 1. A total 2,250 g base ink with a pigment content of 24% was obtained. When tested, this product compared favorably in performance with a base ink of Lithol Red containing 26% dry pigment.

This base ink can be converted to gravure ink in accordance with the following formulations:
(A) Red ink for coated paper
  55.2 parts St. John's MR-522 varnish
  37.8 parts of the above red base ink
  6.0 parts wax dispersion
(B) Red ink for uncoated paper
  44 parts St. John's MR-522 varnish
  49 parts of the above red base ink
  4 parts clay base
  2 parts solvent
  1 ethyl hydroxyethyl cellulose dispersion Both inks are made in simple agitation equipment and diluted with 60 ml toluene to 18 second viscosity in No. 2 shell cup before application.

COMPARATIVE EXAMPLE 4

The run of Example 3 was repeated except that no Duomeen T was added. Neither bead formation nor flushing occurred after 3 hours of agitation.

EXAMPLE 5

The run of Example 3 was repeated except that 25 g of Triamine T were substituted for the Duomeen T. Bead formation occurred, and a similar base ink was made directly from the slurry as in Example 3.

EXAMPLE 6

A slurry of Pigment Red 57-1 (Lithol Rubine) containing 400 g of pigment and 25 g of Duomeen T was converted directly to a base ink using the procedure of Example 1. The final temperature in the mixer's jacket was allowed to reach 100° C. near the end of azeotropic distillation in order to remove crystalline water in the pigment molecule. The final ink was comparable to an ink made from dry pigment.

EXAMPLE 7

The run of Example 1 was repeated except that instead of St. John's MR-522 varnish, Union Camp Corp.'s Unirez 1061 varnish containing calcium, zinc and magnesium resinates was used. Pigment in the slurry was directly converted to a base ink, which was comparable to base ink made from dry pigment.

EXAMPLE 8

Example 1 was repeated except that St. John's MR-522 varnish was replaced by a lactol spirit-based varnish, namely St. John's MR-509 varnish. As in Example 1, a base ink was made directly from the slurry.

It will be understood that the invention as described and illustrated above is subject to variations and modifications without departing from its basic concepts. Thus, for example, it is possible to apply the process of this invention in the manufacture of offset printing inks as well as other ink vehicles.

What is claimed is:

1. A process for the preparation of a base ink suitable for conversion to gravure printing ink comprising the steps of:
   (a) admixing an aqueous slurry of a pigment with a solution of at least one metal resinate in an organic solvent, the resulting admixture having a solvent to metal resinate weight ratio of at least 40:60, a pH ranging from 4 to 10, and containing a minor amount of a $C_8$–$C_{24}$ fatty acid amine or $C_8$–$C_{24}$ fatty acid quaternary ammonium salt, said metal resinate being selected from the group consisting of: (i) calcium resinate, (ii) magnesium resinate, (iii) a mixture of a major amount of calcium resinate and a minor amount of zinc resinate, (iv) a mixture of a major amount of magnesium resinate and a minor amount of zinc resinate, and (v) a mixture of a major amount of calcium resinate plus a minor amount of magnesium resinate and zinc resinate;
   (b) agitating the resultant admixture in a mixer at a temperature of from about 15 to about 95° C. for a time sufficient to form large pigment beads;
   (c) discontinuing the agitation and permitting the large pigment beads to separate;
   (d) removing water from the large pigment beads by physical means other than filtration;
   (e) removing residual water from the pigment mass resulting from step (d) by azeotropic distillation; and
   (f) cooling the resultant substantially water-free mass to ambient temperature.

2. The process of claim 1 wherein said fatty acid amine or quaternary ammonium salt is added to the aqueous pigment slurry.

3. The process of claim 1 wherein said fatty acid amine or quaternary ammonium salt is added to the admixture of the aqueous pigment and the organic solution of the metal resinates.

4. The process of claim 1 wherein said metal resinate consists of a mixture of a major amount of calcium resinate and a minor amount of zinc resinate.

5. The process of claim 1 wherein said metal resinate consists of a mixture of a major amount of calcium resinate and a minor amount of magnesium resinate plus zinc resinate.

6. The process of claim 1, wherein the solvent is selected from the group consisting of toluene, lactol spirits, and $C_5$–$C_{20}$ aliphatic hydrocarbons.

7. The process of claim 1, wherein the fatty acid amine is N-tallow-1,3-diaminopropane.

8. The process of claim 1, wherein agitation in step (b) is carried out for a time period ranging from 15 to 180 minutes.

9. The process of claim 1, wherein agitation in step (b) is carried out at a temperature ranging from 20 to 50° C.

10. The process of claim 1 wherein the amount of fatty acid amine or fatty acid quaternary ammonium salt is in the range of about 2 to about 30 wt. %, based on the weight of the pigment.

11. The process of claim 1 wherein the amount of fatty acid amine or fatty acid quaternary salt is in the range of 5 to 10 wt. %, based on the weight of the pigment.

12. A process for the preparation of a base ink suitable for conversion to gravure printing ink comprising the steps of:
(a) admixing an aqueous slurry of a pigment with a solution of metal resinates in toluene, said metal resinates consisting of 60–90% calcium resinate and the balance being zinc resinate, said toluene being present in an amount such that the toluene to metal resinate weight ratio is at least 40:60 and containing 5 to 10 wt. %, based on the weight of pigment, of N-tallow-1, 3-diaminopropane, said admixture having a pH ranging from 5 to 8;
(b) agitating the resultant admixture for 0.5 to 1 hour at a temperature of 20–50° C. to form large pigment beads;
(c) discontinuing the agitation and permitting the large pigment beads to separate;
(d) removing water from the large pigment beads by decantation or siphoning;
(e) removing residual water from the pigment mass resulting from step (d) by azeotropic distillation carried out under vacuum at a temperature in the range of 80 to 90° C.; and
(f) cooling the resultant substantially water-free mass to ambient temperature.

13. A process for the preparation of a base ink suitable for conversion to gravure printing ink comprising the steps of:
(a) admixing an aqueous slurry of a pigment with a solution of metal resinates in toluene, said metal resinates consisting of 60–90% calcium resinate and the balance being a mixture of 5–15% magnesium resinate and 5–25 % zinc resinate, said toluene being present in an amount such that the toluene to metal resinate weight ratio is at least 40:60 and containing 5 to 10 wt. %, based on the weight of pigment, of N-tallow-1, 3-diaminopropane, said admixture having a pH ranging from 5 to 8;
(b) agitating the resultant admixture for 0.5 to 1 hour at a temperature of 20–50° C. to form large pigment beads;
(c) discontinuing the agitation and permitting the large pigment beads to separate;
(d) removing water from the large pigment beads by decantation or siphoning;
(e) removing residual water from the pigment mass resulting from step (d) by azeotropic distillation carried out under vacuum at a temperature in the range of 80 to 90° C.; and
(f) cooling the resultant substantially water-free mass to ambient temperature.

14. The process of claim 1, wherein said base ink is converted to a gravure printing ink by mixing with varnish, solvent and other ink additives.

* * * * *